United States Patent [19]
Zhou

[11] Patent Number: 5,446,644
[45] Date of Patent: Aug. 29, 1995

[54] DC VOLTAGE DIVIDER

[76] Inventor: Fu M. Zhou, Room 301 Unit 1, 9 of 28, Gaoloumen, Xuanwu District, Nanjing, Jiangsu, China

[21] Appl. No.: 327,845

[22] Filed: Oct. 24, 1994

Related U.S. Application Data

[63] Continuation of Ser. No. 27,764, Mar. 8, 1993, abandoned.

[30] Foreign Application Priority Data

Mar. 10, 1992 [CN] China .................. 92101331.0

[51] Int. Cl.$^6$ .................................. H02M 3/06
[52] U.S. Cl. ........................... 363/62; 307/110; 320/1
[58] Field of Search ............ 363/62; 320/1; 307/109, 307/110

[56] References Cited

U.S. PATENT DOCUMENTS

| | | | |
|---|---|---|---|
| 3,477,011 | 5/1968 | Westwood | 363/62 |
| 4,649,468 | 3/1987 | Cubbison, Jr. | 363/62 |
| 4,680,688 | 7/1987 | Inou et al. | 363/21 |

FOREIGN PATENT DOCUMENTS

| | | | |
|---|---|---|---|
| 0152841 | 12/1979 | Japan | 363/62 |
| 0066581 | 4/1983 | Japan | 363/62 |
| 0112468 | 7/1983 | Japan | 363/62 |

*Primary Examiner*—Steven L. Stephan
*Assistant Examiner*—Adolf Berhane

[57] ABSTRACT

A DC voltage divider for converting electric energy which includes capacitors, diodes and switches. The divider is a device for unidirectional transmission, on the condition that its input and output operate alternatively. The divider divides a high voltage input into a low voltage DC output. The transmission ratio of input impedance to output impedance is equal to $N^2$, where N is the number of capacitors included in the divider. The divider can be used in electric power supply devices to replace transformers to transform an input voltage to a lower value. The divider also has high power output and efficiency. The divider is small in size, low in cost, and its output can be controlled by adjusting the operating frequency.

16 Claims, 5 Drawing Sheets

FIG. 2
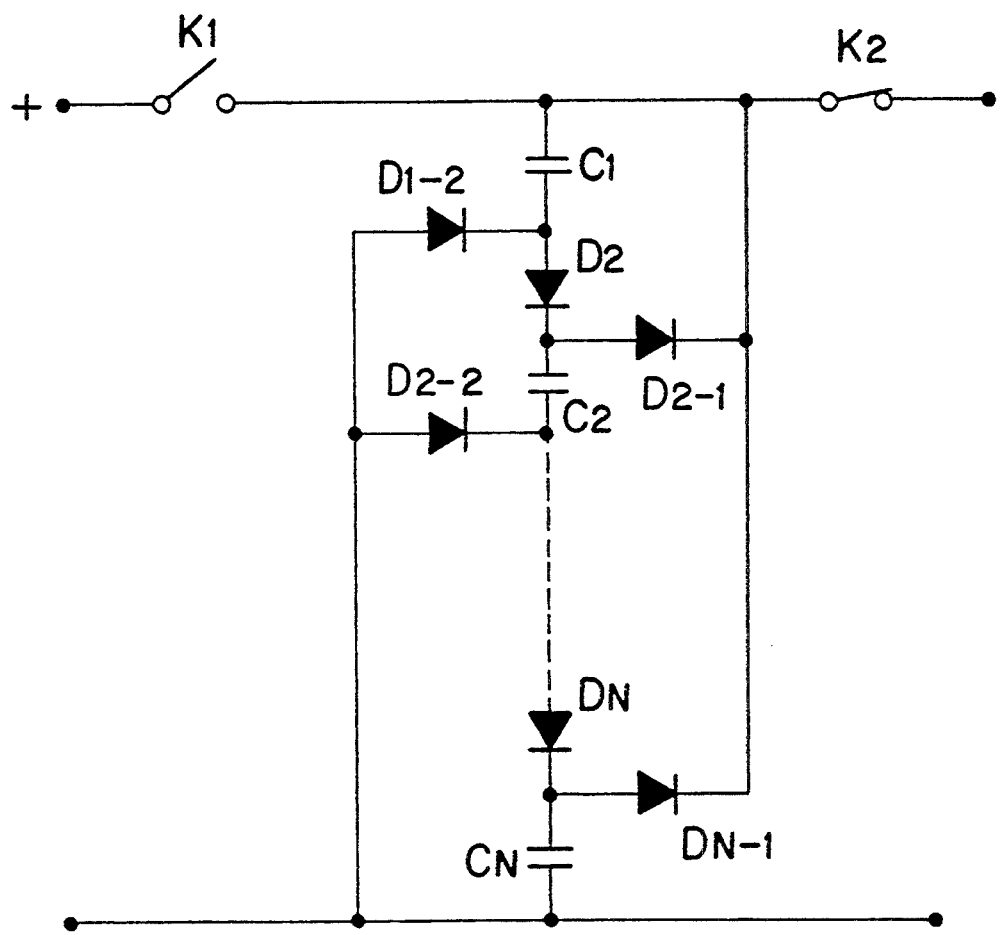
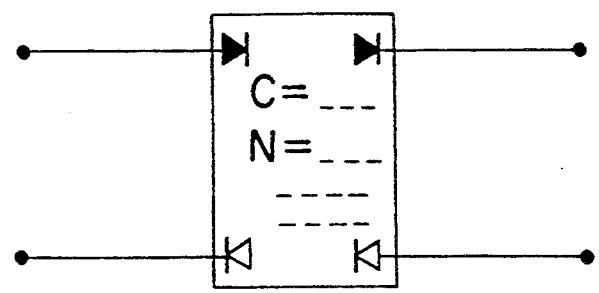
FIG. 3

DC VOLTAGE DIVIDER

This application is a continuation of application Ser. No. 08/027,764 filed on Mar. 8, 1993, now abandoned.

BACKGROUND OF THE INVENTION

I. Field of the Invention

The present invention relates to electric power converters. More particularly, the present invention relates to a DC voltage divider comprising capacitors, diodes and switches which is used to convert high voltage input into DC low voltage output.

II. Description of the Prior Art

AC transformers are electric power converters comprising inductance coil and core, since their invention more than one hundred years ago, they have been widely used in electrical and electronic engineering, and have occupied an almost exclusive position in the field of electric power conversion. However, they cannot meet the requirement for modern electrical equipment of small size, low material cost and low power loss.

An AC transformer is a device for bidirectional tramission, i.e., both its input and output are alternating. It is this feature that makes the AC supply mode the most widely adopted mode in power supply lines. Although the AC supply mode is convenient for power systems, AC networks are difficult to connect together. The utilization rate of the power lines is low. The loss is comparatively high, and there is no unified standards for the supply modes. Moreover, there exist phase loss and AC-DC conversion loss in the power-consuming system.

For a long time, efforts have been made to find a new converter for electric power that is superior to a transformer in its integrated specifications such as performance, volume and efficiency.

In power-consuming systems, with the development of modern micro-electronic technique, it is badly needed to provide small-sized, highly reliable low voltage and large current power sources for applications in computers, modern communication devices and other automatic devices. For this purpose, switching power sources have been developed by using high frequency control techniques to reform the transformer, and through efforts of years, accompanying the development of high frequency power devices, switching power sources that supply several watts, tens of watts, even kilowatts are being used in increasingly broader applications.

However, the switching power sources of the prior art still use transformers for voltage conversion, and transformers operating at high frequency have the problems such as high reverse peak voltage and radiation interference, and it is difficult to fabricate high power. In particular, there exists the problem of a power limit for high frequency transformers.

The number of turns of the primary and secondary coils, hence the volume, of the transformer can be reduced by elevating the operating frequency, but the inductive reactance of the transformer increases with the elevating of its operating frequency. This will restrict its power output, so elevating the operating frequency of a transformer is contradictory to increasing its power output. A tradeoff must be made. This is the reason why the practical power of switching power sources was limited to several watts to several kilowatts during 20 to 30 years after they were developed.

A switching power supply technique can elevate the efficiency of electrical equipment. It is an effective approach for saving eletric energy, but the practical application of switching power sources in some low voltage, low efficiency, large current devices that consume large amount of power such as electrolyzing, electroplating or electric welding devices still has some difficulties. The power consumed by these devices occupies a large portion of the industrial power supply, so the reforming of these devices to reduce energy consumption on a large scale is a breakthrough anxiously anticipated in the field of electrical and electronic techniques.

The key in the innovation of power sources is the electric energy converter.

As is well known, inductors and capacitors are both energy storing elements in elecrtical technology, and there exists an one-to-one correspondence between their electric characteristics. While transformers are electric energy converters made of inductors, analogous converters may be made of capacitors.

The energy stored in a conductor L or a capacitor C is, respectively $$E_L = LI^2/2 \text{ (J)}$$

$$E_C = CV^2/2 \text{ (J)}$$

the above two equations are made equal and some certain values are substituted thereinto:

$$1 \text{ } mH \times 100^2 \text{ } A/2(J) = 1000 \text{ } \mu F \times 100^2 \text{ } V/2 \text{ } (J)$$

It can easily be seen from these formulae that the energy stored in an inductor of 1 mH when a current of 100 A flows through it is equal to that stored in a capacitor of 1000 μF when it is charged to 100 V. In engineering practice, the volume of such an inductor is quite different from that of the capacitor mentioned above, the latter is small and easy to realize, while the former is bulky as can be conceived from the cross-section of the wire that allows 100 A to flow in it. Obviously, capacitors are far much superior to inductors in the function of storing energy, and this feature will manifest itself when capacitors are used to make energy converters.

Moreover,

Reactance of an inductor $= 2 \pi f L$ (Ohms)

Reactance of a capacitor $= 1/[2 \pi f C]$ (Ohms)

the reactance of an inductor is directly proportional to the product of inductance and frequency, it increases with the frequency, while the reactance of a capacitor is inversely proportional to the product of capacitance and frequency, it decreases when the frequency increases. This feature is what we need. It means that different output power can be obtained by changing the operating frequency of the capacitor, i.e. to get larger power output by raising the operating frequency.

SUMMARY OF THE INVENTION

The object of the present invention is to provide a DC divider that has a large power output and high efficiency, and that can save energy.

Another object of the present invention is to provide a DC divider that is small in size and low in cost, and that is adaptable to produce in series and integration.

A further object of the present invention is to provide a DC divider which output can be controlled by adjusting the operating frequency.

According to One aspect of the present invention, a DC divider is provided which comprises an input circuit consisting of a plurality of serially connected energy-storing circuits and an isolating diode connected serially to these energy-storing circuits, and an output circuit consisting of a plurality of parallelly connected energy-releasing circuits which works alternatively in sequence with respect to said input circuit; said energy-storing circuit consists of an input diode and a capacitor connected to the cathode of said input diode, said energy- releasing circuit consists of said capacitor and the 1st and 2nd output diode connected serially to said capacitor; the anode of said 1st output diode is connected to the one terminal of said capacitor that connects with the cathode of said input diode, and the cathode of said 2nd output diode is connected to the other end of said capacitor.

According to another aspect of the present invention, a DC divider is provided which comprises an input circuit consisting of a plurarity of serially connected energy-storing circuits and the isolating diodes connected between said energy-storing circuits, and an output circuit consisting of a plurality of parallelly connected energy-releasing circuits which works alternatively in sequence with respect to said input circuit; said energy-storing circuit consists of a capacitor, and said energy-releasing circuit consists of said capacitor and at least one output diode connected serially to said capacitor.

The DC divider according to the present invention, since it works alternatively for its input and output, may divide the high voltage input into low voltage DC output. It can be used in electrical equipment in place of a transformer for transforming the voltage to a lower value, and it has the features of being small in size, low in fabrication cost, and adaptable to be produced in series and integration. Moreover, the DC divider uses capacitors as its energy-storing elements, so energy conversion is effected with low loss and high efficiency. The output power of the DC divider of the present invention is directly proportional to the operating frequency, so there is no restriction on its operating frequency, and the output power can be controlled by adjusting the operating frequency. Thus, a stable output can also be maintained by the same method.

BRIEF DESCRIPTION OF THE DRAWINGS

The DC divider of the present invention will be described in more detail below with reference to the attached drawings and the preferred embodiments thereof.

FIG. 2 is a diagram showing the electrical principle of the second embodiment of the DC divider of this invention.

FIG. 3 is a simplified diagram representing the portion of FIG. 1 enclosed by dash lines.

DETAILED DESCRIPTION OF THE INVENTION

Figure 1:
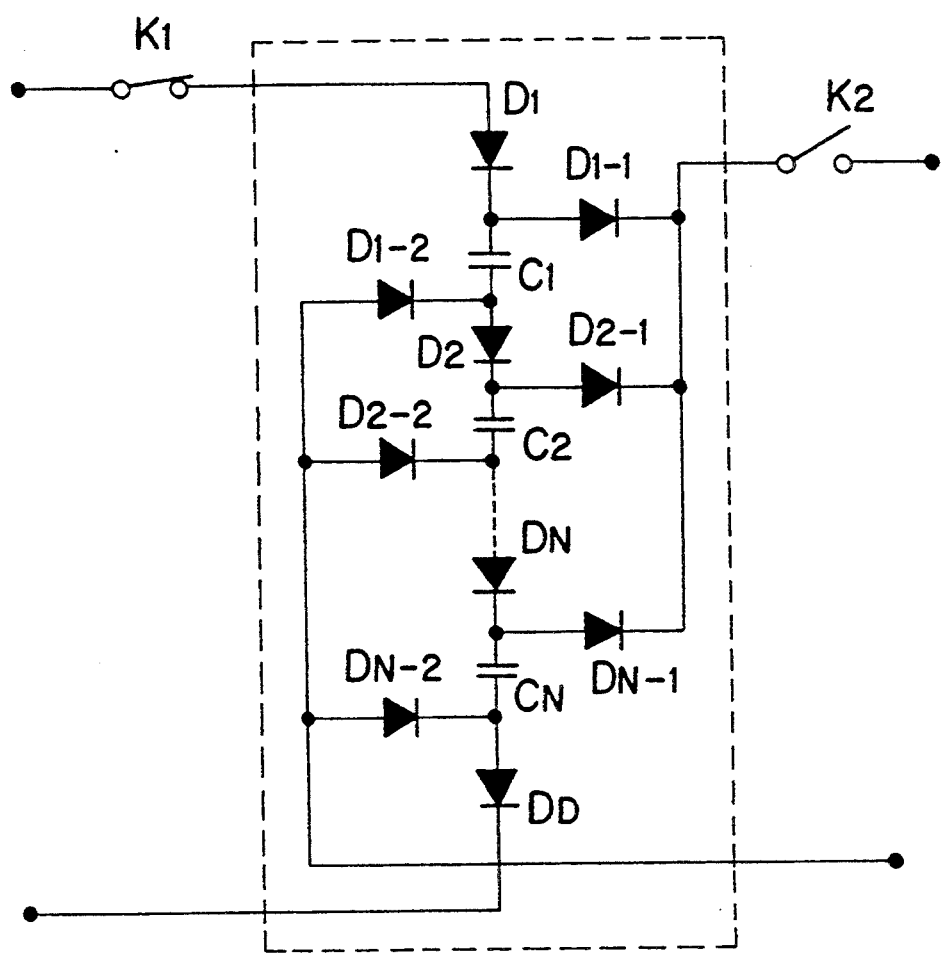
FIG. 1 is a diagram showing the electrical principle of the first embodiment of the DC divider of this invention.

As shown in FIG. 1, the first embodiment of the DC divider of the present invention comprises a plurality of capacitors and diodes, among which $D_1$, $C_1$, $D_2$, $C_2$, ... $D_n$, $C_n$ and $D_D$ are connected sequentially in series to form the input circuit; $D_{1-2},C_1,D_{1-1};D_{2-2},C_2,D_{2-1}$; ... $D_{n-2},C_n,D_{n-1}$ are first connected serially in a triple group and then the groups are connected in parallel to form the output circuit. Where $C_1,C_2 ... C_n$ are in both the input and output circuits, and $C_1=C_2= ... =C_n$. $D_D$ is the isolating diode.

Control switches K1 and K2 are located respectively in the input and output circuit, they open and close alternatively, so as to meet the operating condition of the DC divider.

When a sufficiently high voltage from an electric source is forward applied to the input of the DC divider through K1, the capacitors are charged in series, and the source voltage is divided into N equal voltages. Owing to the reverse blocking effect of the correponding diodes connected to each capacitor, an independent electric field with a certain amount of energy will be formed and held in each capacitor. Thus, the process of energy storing and voltage-dividing is completed. Then K1 is opened and K2 closed. The capacitors will be discharged in parallel, and the initial voltage of discharging is the charged voltage on each capacitor, i.e. the divided peak voltage of the electric source charging the capacitors. This is the process to effect electric energy conversion.

The DC divider effects electric energy conversion through the energy-storing and the energy-releasing processes. These two processes cannot be effected at the same time. The DC divider can only operate normally by using the control switches K1 and K2 to separate the time periods for input and output. This is a condition required by the DC divider. At no time shall the switches K1 and K2 both be closed. Otherwise the input and output will be shortcircuited, and damaging results will occur. Therefore this switching state is not permissible, and is referred to as the "prohibited state". As long as the prohibited state is avoided, there is no restriction on the operating frequency of the divider. Very low to high freqencies may be used, and the operating frequency can also be adjusted at will to meet different requirements.

The second embodiment of the DC divider of the present invention is shown in FIG. 2. As seen from the drawing, it omits the diodes $D_1,D_D,D_{1-1}$, and $D_{n-2}$ in the divider in FIG. 1. This kind of DC divider is used when the voltage of the electric source contains no alternating component, and is forward connected to the input while the voltage drop of the output diodes is negligible. In designing practical circuits, the number of diodes used in the divider can be increased or decreased according to the circuits in FIG. 1 and FIG. 2 to meet different requirements, on the condition that the capacitors are in series for input and in parallel for output.

FIG. 3 is a simplified diagram representing the portion in FIG. 1 enclosed by dash lines. The parameters of a practical divider may be given in the diagram, e.g. C= ...,N= ..., etc.

The following discussion will proceed with reference to FIG. 3, with no more specific description for the internal structure.

Capacitors are the most important elements in the DC divider. Extensive types of capacitors can be used, even electrolytic capacitors. In addition to meeting the requirements for their characteristics on breakdown voltage, allowable current, loss and operating frequency, the capacitors used in a DC divider shall have the same capacitance, and careful sieving shall be effected to select the capacitors.

Many diodes are used in the DC divider of this invention, they shall be chosen mainly according to their switching characteristic, reverse leakage current and forward peak current.

Generally, electronic switches are used as the control switches in the DC divider of this invention, e.g. SCR, transistors or FETs, but electromagnetic or mechanical, even manual, switches may also be used. No strict requirement is demanded for the breakdown voltage of the control switches in designing the divider. It is usually enough to leave a moderate margin to the input voltage from the power source. On the other hand, a high value of allowable current for the control switches is demanded, so the switches shall be chosen mainly according to their allowable peak current. Since the output power of the DC divider may be very high, there is no need to excessively elevate its operating frequency, but, if necessary, the operating frequency may be elevated to equalize the peak current passing through the control switches.

The loss of the DC divider of this invention is mainly due to the leakage current and high frequency loss of the capacitors. The voltage drop and the switching loss of the diodes, adaptable capacitors. The diodes shall be chosen to form the DC divider according to the requirements of different applications.

The loss due to the control switches in the DC divider of this invention depends on which type of switch is used in the divider. When electronic switches are used, their loss is not negligible, especially when operated at high frequencies. The loss of switches may become the major part of the loss in the whole circuit, so the switches shall be chosen according to their switching parameters. Sometimes it is necessary to restrict the operating frequency to a lower value.

High efficiency can be obtained in the power source using the DC divider of this invention. Through calculation and practice, it can be readily verified that the total loss may well be controlled below 10%.

When a DC divider consists of N capacitors of equal capacitance,

Input capacitance = $C/N$

Output capacitance = $NC$ neglecting its input and output resistance,

Input impedance = $N/(2 \pi f)$

Output impedance = $1/(2 \pi f N C)$ the ratio of input to output impedance equals to $N^2$.

$N^2$ is referred to as the ratio of impedance transmission of the divider, which is a common parameter in all electric power converters.

The ratio $N^2$ means that the impedance transmission is irrelevant to the capacitances of the capacitors. It depends only on the number of capacitors involved. The more capacitors included in the divider, the higher the impedance transmission ratio, and vice versa. In other words, the lower output voltage needed, the more capacitors shall be used, and vice versa.

The divider of this invention transforms voltage through "division". The voltage of the input source is the dividend, and N is the divisor. Electric energy convertors are usually regarded as a voltage source, but the divider of this invention is a current source. Moreover, it is a power converter, even though there is only one capacitor in it. The transformation rate of voltage being unity, it still maintains the characteristics of a current source and of a power converter. It cannot be simply regarded as a voltage transformer.

When the loss in conversion is negligible, $$\text{Input energy} = (C/N*V^2)/2 = CV^2/2N \text{ (J)}$$

$$\text{Output energy} = NC*(V/N)^2/2 = CV^2/2N \text{ (J)}$$

the input energy is equal to the output energy. It can be seen from the latter equation that while the output capacitance is increased by N times, the output voltage is decreased by N times. And it can further be concluded that while the output voltage may be changed the output current will not be changed when the number of capacitors in the divider is changed, so long as the total capacitance and the input voltage from the electric source are kept constant. This is the characteristic of current sources.

The output power of the divider is determined by its input voltage, input capacitance and operating frequency. While the input voltage is generally fixed, $$W = CV^2/2S$$

where C is in Farads, V, in volts, W, in watts, S, in seconds.

Several sets of data are given below to show the output power of the divider:

1. V=300 v, C=1 μf, S=20 ms; W=2.25 w

2. V=300 v, C=1 μf, S=50 μs; W=900 w

3. V=300 v, C=1 μf, S=10 μs; W=4500 w

4. V=300 v, C=100 μf, S=20 ms; W=225 w

5. V=300 v, C=0.01 μf, S=10 μs; W=45 w

It can be seen from the above data that the output power of the divider may be very high and is closely related to the operating frequency: if the input is from a 50 hertz source of power, the output power will be changed from 2.25 to 225 watts when the input capacitance is changed from 1 μf to 100 μf; and if the input capacitance is 1 μf, the output power will become 4500 watts when the operating frequency is increased to 100 kilohertz.

On the same divider, not only different output power can be obtained by changing the operating frequency, but also the operating frequency can be controlled by feedback signals from the output terminals, so as to provide a source of constant voltage and constant current.

The structure of the divider of the present invention determines that it is adaptable to production in series, standardization and integration, a number of series with different power output and impedance transmission ratios may be set up through optimization, and dividers of low loss, low cost, small size and easiness for use can be produced.

Control switches are indispensable in the divider of this invention, while it is not so in a transformer. Because transformers work with alternating currents, the alternating positive and negative half periods of the electric current provide the condition necessary to separate the periods for energy-storing and energy-releasing. An electric energy converter must possess both the function of energy-storing and the function of energy-releasing. The divider of this invention is a DC electric energy converter in nature, and it effects electric energy conversion by means of the electric field. In order to perform the energy-storing and energy-releasing function on the same capacitor, the control switches and the reverse blocking effect of the diodes are utilized to effect a "switching over".

A complete isolation between input and output as that in a transformer cannot be obtained in the divider of this invention. The divider effects isolation by means of the reverse blocking effect of the diodes and the cutoff effect of the control switches. A leakage current is unavoidable in these devices, so necessary precautions have to be taken in designing the circuits for different applications.

When a high DC voltage is forward applied to the input of the divider, a diode voltage stabilizer with stabilized voltage somewhat higher than that of the output voltage may be connected in parallel to the output terminals so as to allow the leakage current in the control switch to pass through. A diode varistor may also be connected in parallel to the output terminals to avoid damages due to the occurrence of the prohibited state.

When the main power supply of 50 hertz is connected to the input of the divider through a half-wave rectifier and a filter and with the "zero" line connected to the "earthed" end of the divider, the situation is similar to that of applying a high DC voltage in forward direction. This is a simple and practical input method for sources with lower power.

Figure 4:
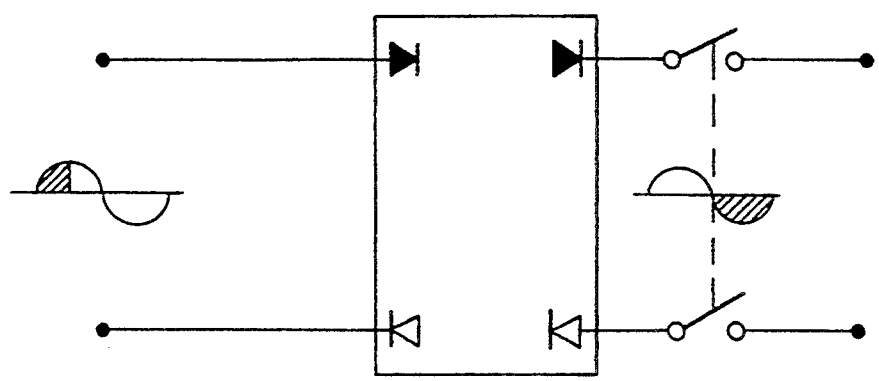
FIG. 4 is a schematic diagram showing the connection of the DC divider in FIG. 3 when its input is the main supply.

When the main supply of 50 hertz is connected directly to the input of the divider, the energy-storing process can only be performed in the first quarter of any period of the alternating current. This case, the control switch K1 can usually be omitted. In order to isolate the negative half period from the positive half period, another control switch may be connected to the output terminal, and both switches can be controlled by the negative half period as shown in FIG. 4.

Figure 5:
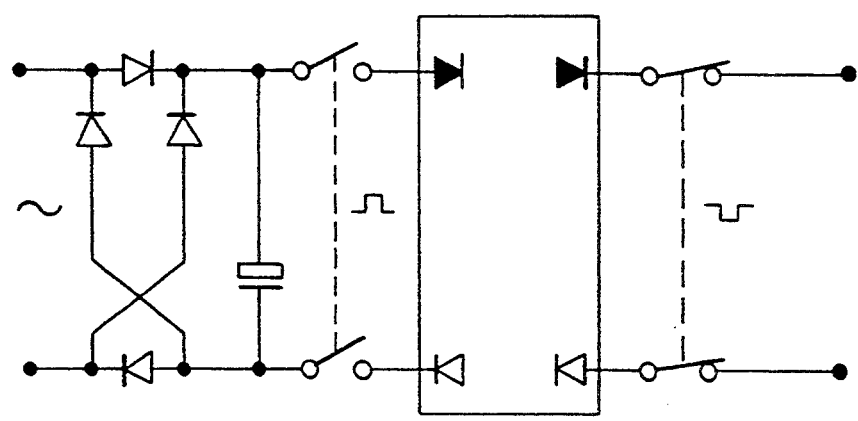
FIG. 5 is a schematic diagram showing the connection of the DC divider in FIG. 3 when its input is connected to the main supply through a full-wave rectifier.

When the main supply of 50 hertz is connected to the input of the divider through a full-wave rectifier and a filter, in order to effect isolation, one ore more switches may be added to both the input and output terminals as shown in FIG. 5. In this case, the operating frequency of the divider is equal to that of the control switches. This frequency can be set by the design requirements.

Figure 6:
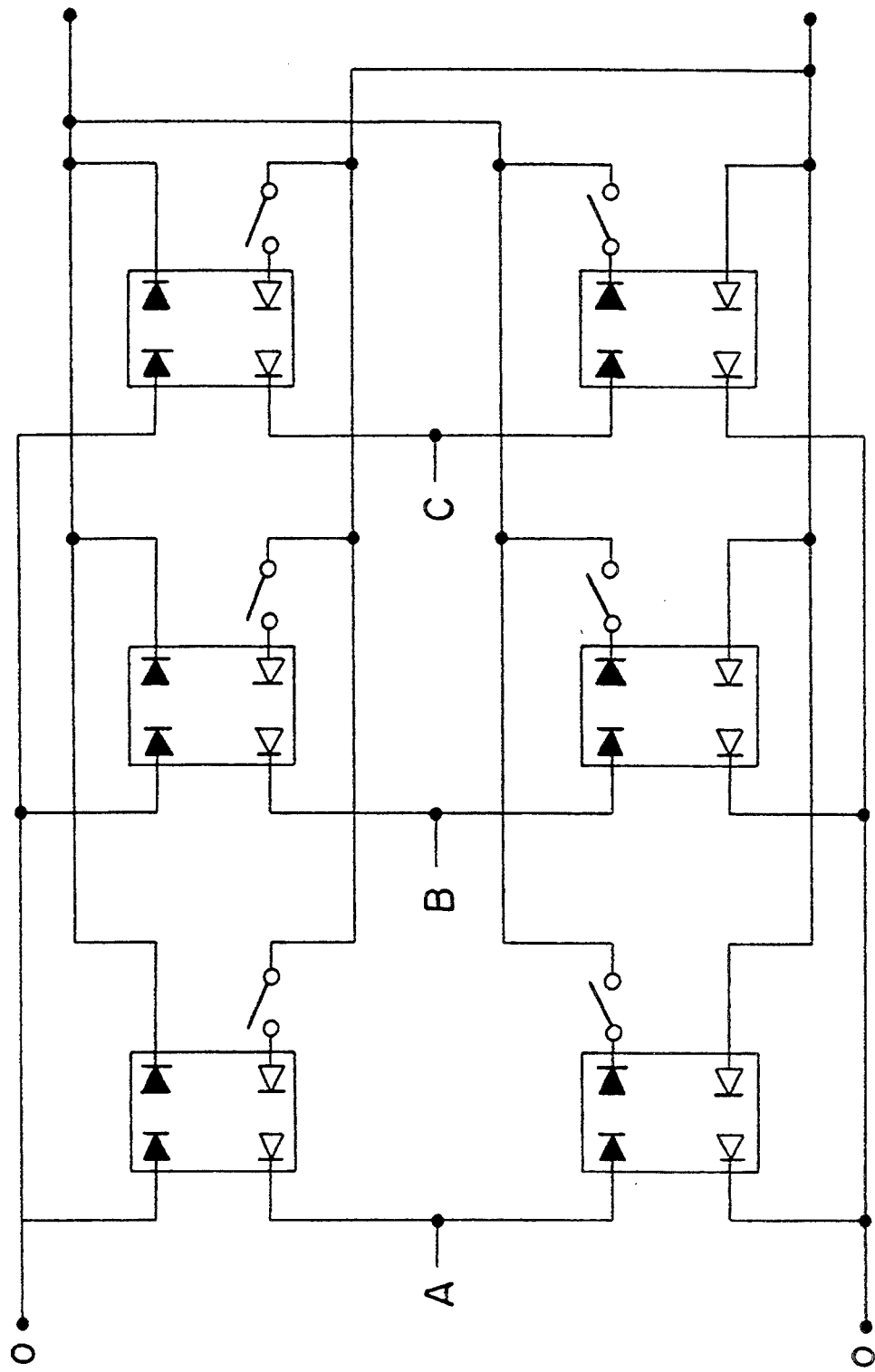
FIG. 6 is a schematic diagram showing the connection of a set of the DC dividers in FIG. 3 when the input is a three-phase alternating source.

When a three phase four line power source is used, a set of individual dividers can be connected as shown in FIG. 6. In the diagram, the dividers operate in parallel connection, and the location of one set of the control switches has been altered.

The dividers of this invention may be used in parallel. This is the condition for designing power sources with modular structure. An example of this scheme is shown in FIG. 6. The main advantage of the power source with modular structure is that the requirement for devices and elements may be loosened somewhat. This is preferable in designing sources that supply high or super-high power.

Figure 7:
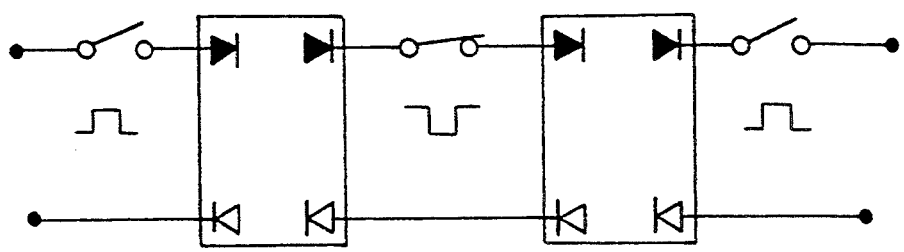
FIG. 7 is a diagram showing two DC dividers in FIG. 3 connected in cascade.

The divider transforms the input voltage through "division". When the dividers are connected in cascade, the output of the preceding stage is the input of the following stage. The initial input is transformed to a lower value by "division in series". In this case, the input switches in the following stage may be omitted, but all switches at each stage must open and close alternatively in sequence, so as to prevent the prohibited state from occuring, as shown in FIG. 7.

Figure 8:
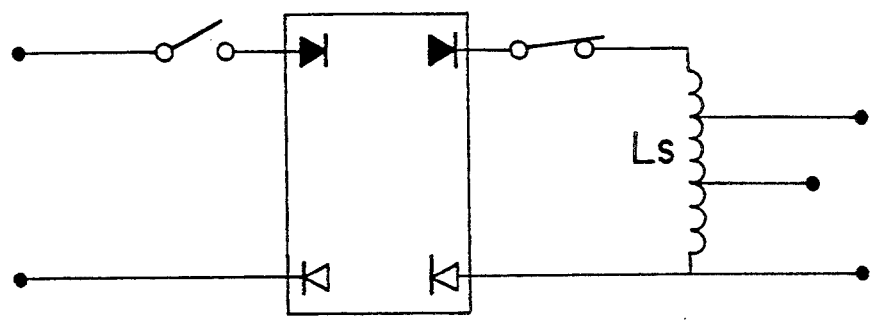
FIG. 8 is a diagram showing the DC divider in FIG. 3 used to obtain output of variable voltages.

Generally, there is only one voltage output in a divider. If more than one output voltage is needed, a tapped inductor may be connected to the output terminals to obtain different output voltages, as shown in FIG. 8.

Both the DC divider and the transformer possess the function of electric energy conversion, their characteristics are usually complementing, and there exists an one-to-one correspondence between these characteristics, a comparison is given below:

DC Divider consisting mainly of capacitors;
is a device for unidirectional transmission;
the media for energy conversion is the electric field;
is a DC converter in nature;
transforms voltage to a lower value through division;
exhibits low impedance to high frequency;
the output may be controlled by adjusting the operating frequency;
effects input only in the 1st and 3rd quarter of any period of the alternating source;
is a current source.

AC Transformer consisting mainly of inductors;
is a device for bidirectional transmission;
the media for energy conversion is the magnetic field;
is an AC converter in nature;
transforms voltage to a lower value through subtraction;
exhibits high impedance to high frequency;
the output may be controlled by adjusting the pulse width;
effects input during the whole period of the alternating source;
is a voltage source.

While an electric power source including transformers can be regarded as an "inductive source", the power source including capacitors can be regarded as an "capacitive source". Significant differences exist between their analyzing methods and designing concepts. Their forms of application are also different, and they adopt different approaches to solve their problems. It is a new task to understand the underlying principles and to put them into flexible applications. The divider of this invention creates the condition for saving on a large scale, on energy source production and thus contributes to improving the ecologic environment and welfare of mankind.

What is claimed is:

1. A DC voltage divider comprising:
   at least one input terminal;
   at least one output terminal;
   an input circuit connected to said input terminal and including a plurality of serially connected energy-storing circuits and an isolating diode connected serially to said plurality of energy-storing circuits, each of said plurality of energy-storing circuits including an input diode and a capacitor, said capacitor having a first and second side, and said first side of said capacitor being connected to a cathode of said input diode;
   an output circuit connected to said output terminal and including a plurality of energy-releasing circuits working alternatively in sequence with respect to said input circuit, each of said energy-releasing circuits including said capacitor and a first and second output diode serially connected to said capacitor, an anode of said first output diode being connected to said first side and a cathode of said second output diode being connected to said second side;
   at least one output switch disposed between each output terminal and said output circuit; and
   at least one input switch disposed between each input terminal and said input circuit, said input switch opening and closing alternatively in sequence with respect to said output switch, said input and output switches being set to operate at a predetermined and adjustable operating frequency so as to set and control a power output of said DC voltage divider, and said operating frequency of said input and output switches being adjustable independently of each capacitor.

2. The DC voltage divider of claim 1, wherein said output switch is one of an electronic switch, mechanical switch, and manual switch.

3. The DC voltage divider of claim 1, wherein said input switch is one of an electronic switch, mechanical switch, and manual switch.

4. The DC voltage divider of claim 1, further comprising an inductive device connected in parallel with said output circuit.

5. The DC voltage divider of claim 1, further comprising a full wave rectifier connected between said input terminal and said input switch.

6. A DC voltage divider comprising:
   at least one input terminal;
   at least one output terminal;
   an input circuit connected to said input terminal and including a plurality of serially connected energy-storing circuits and an isolating diode connected serially to said plurality of energy storing circuits, each of said plurality of energy-storing circuits including an input diode and a capacitor, said capacitor having a first and second side, and said first side of said capacitor being connected to a cathode of said input diode;
   an output circuit connected to said output terminal and including a plurality of energy-releasing circuits working alternatively in sequence with respect to said input circuit, each of said energy-releasing circuits including said capacitor and a first and second output diode serially connected to said capacitor, an anode of said first output diode being connected to said first side and a cathode of said second output diode being connected to said second side; and
   switching means for regulating an operating frequency of said DC voltage divider, and thus, a power output by said DC voltage divider, said switching means regulating said operating frequency independently of a capacitance of each capacitor.

7. The DC voltage divider of claim 6, wherein said switching means comprises:
   at least one output switch disposed between each output terminal and said output circuit; and
   at least one input switch disposed between each input terminal and said input circuit, said input switch opening and closing alternatively in sequence with respect to said output switch.

8. A DC voltage divider comprising:
   at least one input terminal;
   at least one output terminal;
   an input circuit connected to said input terminal and including a plurality of serially connected energy-storing circuits and isolating diodes connected between said plurality of energy-storing circuits, each of said plurality of energy-storing circuits including a capacitor, said capacitor having a first and second side;
   an output circuit connected to said output terminal and including a plurality of energy-releasing circuits working alternatively in sequence with respect to said input circuit, each of said energy-releasing circuits including said capacitor and at least one output diode serially connected to said capacitor;
   at least one output switch disposed between each output terminal and said output circuit; and
   at least one input switch disposed between each input terminal and said input circuit, said input switch opening and closing alternatively in sequence with respect to said output switch, said input and output switches being set to operate at a predetermined and adjustable operating frequency so as to set and control a power output of said DC voltage divider, and said operating frequency of said input and output switches being adjustable independently of each capacitor.

9. The DC voltage divider of claim 8, wherein said output switch is one of an electronic switch, mechanical switch, and manual switch.

10. The DC voltage divider of claim 8, wherein said input switch is one of an electronic switch, mechanical switch, and manual switch.

11. The DC voltage divider of claim 8, further comprising an inductive device connected in parallel with said output circuit.

12. The DC voltage divider of claim 8, further comprising a full wave rectifier connected between said input terminal and said input switch.

13. A DC Voltage divider comprising:
   at least one input terminal;
   at least one output terminal;
   an input circuit connected to said input terminal and including a plurality of serially connected energy-storing circuits and isolating diodes connected between said plurality of energy-storing circuits, each of said plurality of energy-storing circuits including a capacitor, said capacitor having a first and second side;

an output circuit connected to said output terminal and including a plurality of energy-releasing circuits working alternatively in sequence with respect to said input circuit, each of said energy-releasing circuits including said capacitor and at least one output diode serially connected to said capacitor; and switching means for regulating an operating frequency of said DC voltage divider, and thus, a power output by said DC voltage divider, said switching means regulating said operating frequency independently of a capacitance of each capacitor.

14. The DC voltage divider of claim 13, wherein said switching means comprises:

at least one output switch disposed between each output terminal and said output circuit; and at least one input switch disposed between each input terminal and said input circuit, said input switch opening and closing alternatively in sequence with respect to said output switch.

15. A DC voltage divider comprising:

at least two DC voltage divider circuits connected in series, an output switch of a preceding DC voltage divider circuit being an input switch of a succeeding voltage divider circuit, each DC voltage divider circuit including, at least one input terminal;

at least one output terminal;

an input circuit connected to said input terminal and including a plurality of serially connected energy-storing circuits and an isolating diode connected serially to said plurality of energy-storing circuits, each of said plurality of energy-storing circuits including an input diode and a capacitor, said capacitor having a first and second side, and said first side of said capacitor being connected to a cathode of said input diode;

an output circuit connected to said output terminal and including a plurality of energy-releasing circuits working alternatively in sequence with respect to said input circuit, each of said energy-releasing circuits including said capacitor and a first and second output diode serially connected to said capacitor, an anode of said first output diode being connected to said first side and a cathode of said second output diode being connected to said second side;

at least one output switch disposed between each output terminal and said output circuit; and at least one input switch disposed between each input terminal and said input circuit, said input switch opening and closing alternatively in sequence with respect to said output switch, said input and output switches being set to operate at a predetermined and adjustable operating frequency so as to set and control a power output of said DC voltage divider, and said operating frequency of said input and output switches being adjustable independently of each capacitor.

16. A DC voltage divider comprising:

at least two DC voltage divider circuits connected in series, an output switch of a preceding DC voltage divider circuit being an input switch of a succeeding voltage divider circuit, each DC voltage divider circuit including, at least one input terminal;

at least one output terminal;

an input circuit connected to said input terminal and including a plurality of serially connected energy-storing circuits and isolating diodes connected between said plurality of energy-storing circuits, each of said plurality of energy-storing circuits including a capacitor, said capacitor having a first and second side;

an output circuit connected to said output terminal and including a plurality of energy-releasing circuits working alternatively in sequence with respect to said input circuit, each of said energy-releasing circuits including said capacitor and at least one output diode serially connected to said capacitor;

at least one output switch disposed between each output terminal and said output circuit; and at least one input switch disposed between each input terminal and said input circuit, said input switch opening and closing alternatively in sequence with respect to said output switch, said input and output switches being set to operate at a predetermined and adjustable operating frequency so as to set and control a power output of said DC voltage divider, and said operating frequency of said input and output switches being adjustable independently of each capacitor.

* * * * *